May 21, 1963     S. BERK     3,090,862
RADIOACTIVE TEMPERATURE INDICATING DEVICES
Filed Aug. 31, 1959
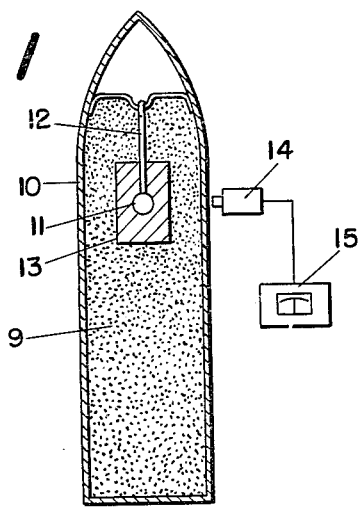
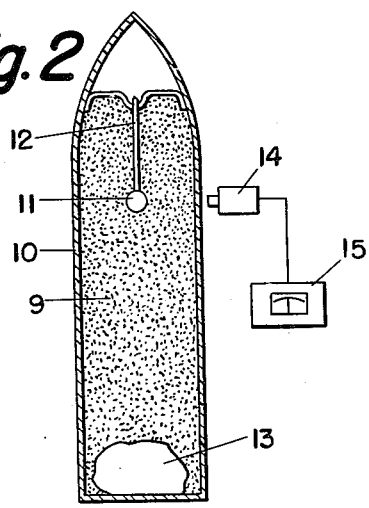
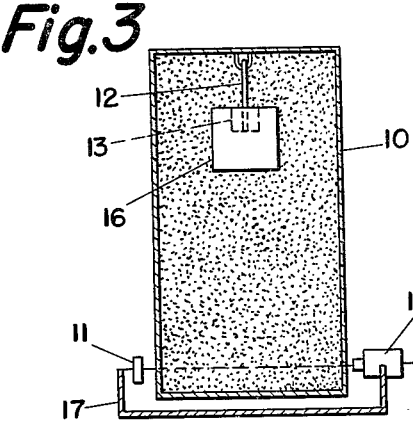
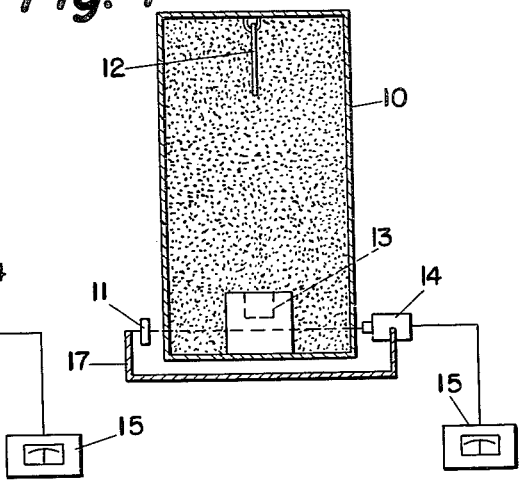
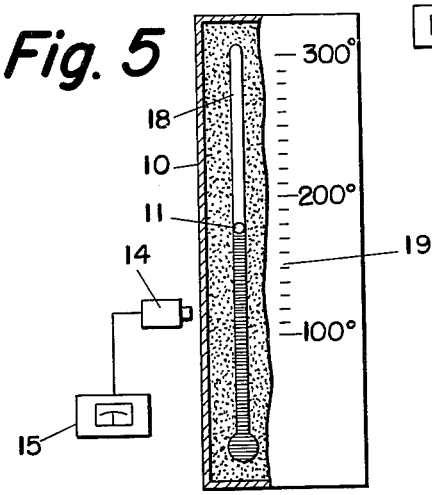
*INVENTOR.*
SIGMUND BERK
ATTORNEYS

United States Patent Office 3,090,862
Patented May 21, 1963

3,090,862
RADIOACTIVE TEMPERATURE INDICATING
DEVICES
Sigmund Berk, Philadelphia, Pa., assignor to the United States of America as represented by the Secretary of the Army
Filed Aug. 31, 1959, Ser. No. 837,304
7 Claims. (Cl. 250—43.5)
(Granted under Title 35, U.S. Code (1952), sec. 266)

The invention described herein may be manufactured and used by or for the Government for governmental purposes without the payment to me of any royalty thereon.

This invention relates to temperature indicating devices and methods, and more particularly to devices and methods for indicating a temperature to which the enclosed components of an assembled apparatus or article have been exposed.

It is often desirable to know the temperature or temperatures to which the enclosed part or parts of an article or device have been exposed. Thus there are many ordnance items which contain components which are sensitive to, or decomposed by, high temperature. For example, temperatures above a certain value have a deleterious effect on the propellants used in cartridge actuated devices. This is true of various other types of devices.

There are currently available certain methods and devices for indicating the temperature of enclosed components. None of these, however, are suitable for use in mass produced articles or devices for the reason that they include thermocouples which are connected to external recording devices for following the temperature changes of the enclosed item. In accordance with the present invention, this difficulty is avoided by (1) locating in the vicinity of the inclosed component a radioactive source of radiation, (2) providing exterior to the enclosure a radiation detector and indicator, and (3) utilizing the temperature within the enclosure in one way or another to actuate means whereby the detector is exposed to the radiation from the radioactive source.

The invention will be better understood from the following description when considered in connection with the accompanying drawings and its scope is indicated by the appended claims.

Referring to the drawings:

FIG. 1 illustrates a temperature indicating system wherein a shield impervious to radioactive radiation is arranged to surround the radioactive source until the temperature within the enclosure has had a predetermined value for a predetermined time, FIG. 2 is another illustration of the system of FIG. 1 wherein the shield is shown melted after being subjected to sufficient heat, FIG. 3 illustrates a system which differs from that of FIGS. 1 and 2 in that the radioactive source is not shielded from the indicator until the selected temperature has existed for a predetermined time, FIG. 4 is yet another illustration of the system of FIG. 3 wherein the shield has been displaced from its original position, and FIG. 5 illustrates a system wherein the radioactive source continuously indicates the highest temperature to which the enclosed item has been exposed.

In the system of FIGS. 1 and 2, a casing 10 encloses material 9 which is destroyed or deteriorates when exposed to a predetermined temperature for a predetermined time. Located within the container 10 is a radioactive source 11 which is supported by a wire 12 and is surrounded by a fusible shield 13 which is impervious to the radiation emitted by the source 11. A radiation detector 14, exterior to the casing 10, is connected to an indicator 15. In the operation of the system, the shield 13 melts and separates from the source 11 when a predetermined temperature has existed for a predetermined time. This exposes the detector 14 to the radiation emitted by the source 11 and produces an effect on the indicator 15.

The substance of the shield 13 is selected to have a melting point which conforms to the temperature and temperature duration at which destruction or deterioration of the enclosed material or article occurs. A number of fusible alloys containing bismuth, lead, tin and cadmium are available with melting points ranging from 47° to 290° C. Thus alloy A has a melting temperature of 74° C. and a temperature range of 72 to 88° C. This alloy was used in a system similar to that of FIGS. 1 and 2. This was done by putting the melted alloy into a brass cup and inserting one end of the wire, together with the radioactive source, into the melted alloy. When the alloy had solidified, the cup was suspended from a support in a convection oven. As the temperature rose, the alloy softened finally releasing the cup from the support. The following time and temperature were required to release the cup:

| Temperature: | Time (minutes) |
|---|---|
| 72 | 40 |
| 73.5 | 15 |
| 78 | 12.5 |

Various changes in the type and arrangement of the shield material are possible. Thus the radioactive source may be inserted in or attached to the enclosed material or article and shielded by an organic compound, wax, solder, an eutectic mixture or the like which melts under the required temperature conditions.

The type of radioactive source to be used depends on the thickness and type of metal in the assembled device under test. The usual activity will vary from one microcurie to ten millicuries. Radioisotopes which may be used are strontium-90, cobalt-60, ruthenium-106, silver-110, thallium-204, zinc-65, and cesium-134.

The temperature indicating system of FIGS. 3 and 4 differs from that of FIGS. 1 and 2 in that it includes a lead cylinder 16 having a recess which is filled with a fusible material 13. This assembly is supported by a wire 12 at a suitable place in the enclosed article. In this case, the detection system consists of a ring 17 which skirts the item under test. At one end of this ring is a radioactive source 11 and at the other end is a detector 14 which is connected to an indicator 15. The source 11 may be shielded to protect the operator of the device.

In the operation of this modification of the system, the indicator 15 provides a reading of high radioactivity (1000 to 10,000 counts per minute depending on the activity of the source). However, if the test item has been exposed to the critical temperature, the fusible alloy melts and releases the lead shield which moves to the bottom of the casing and intercepts or shields the radiation from the source 11. As a result the reading of the indicator 15 is greatly reduced.

FIG. 5 illustrates a modified temperature indicating system which is applicable where the exact value of the highest temperature to which the enclosed article has been exposed is to be indicated. This system includes a capillary tube 18 which is located within the casing 10 and encloses mercury, alcohol or other temperature sensitive liquid. A collimated radioactive float 11 is located above this liquid and rides along the inner wall of the tube with just enough friction to maintain it at the highest point to which it is moved by expansion of the liquid. The detector 14 is used to locate the source 11. An external scale 19 is provided to show the position of the source at the critical temperature. Where an external method for determining the exact temperature of any component or group of components in an assembled item is desired, radioactive mercury-203 or some other radioisotope may be incorporated in the fluid of a normal thermometer. As the temperature rises, the radioactive fluid moves along and an external scale with a radiation detector attached will indicate the position of the radioactive fluid.

Various modifications of the above systems are possible. Thus the radioisotope may be incorporated in a compound which volatilizes at a predetermined temperature. Under these conditions the compound is shielded until it volatilizes. When this happens, the liberated radio-active gas is measured externally.

I claim:

1. A device for positively indicating whether a container-enclosed component has been previously subjected to critical temperatures comprising in combination therewith a radioactive source of radiation therewithin, means within said container for changing the radiation emitted to a predetermned point when said means have been exposed to said critical temperatures, and a radiation detector extrenally of said container for detecting said radiation.

2. A device for positively indicating whether a container-enclosed component has been previously subjected to critical temperatures comprising in combination therewith a radioactive source of radiation, means for enclosing said radioactive source therewithin, said means being supported within the container and surrounded by said component, a radiation detector externally of said container, said means being operable to admit said radiation to said detector at said critical temperatures.

3. The device of claim 2 further characterized by said means being a fusible shield impervious to said radiation and having a melting point generally similar to said component.

4. The device of claim 3 further characterized by said shield being a fusible alloy having a melting point within the range of about 47° to 290° C.

5. The device of claim 3 wherein said shield is an organic wax having a melting point generally similar to said component.

6. A device for positively indicating whether a container-enclosed component has been previously subjected to critical temperatures comprising in combination therewith a shield releasably supported within said container and surrounded by said component, said shield having a recess adjacent an upper portion, a fusible material having a melting point substantially the same as the critical temperature of said component and secured within said recess, supporting means fixed to said container cooperating with said fusible material when the temperature is below said melting point, a radioactive source of radiation externally adjacent a lower portion of said container, said shield being impervious to said radiation, and detector means in externally opposed diametrical relation to said radioactive source for receiving said radiation when said radiation is not interrupted by said shield, whereby the reception of radiation by said detector indicates that the devce had not been exposed to a critical temperature, and the absence of reception of radiation indicates that the device had been exposed to a critical temperature which caused said fusible material to melt and allow said shield to separate from its support and fall into a position between said radioactive source and said detector.

7. The device of claim 6 wherein said shield is lead.

References Cited in the file of this patent

UNITED STATES PATENTS

| | | |
|---|---|---|
| 2,534,352 | Herzog | Dec. 19, 1950 |
| 2,652,497 | Miller | Sept. 15, 1953 |
| 2,670,443 | Pennock | Feb. 23, 1954 |
| 2,714,168 | Hencke et al. | July 26, 1955 |
| 2,874,303 | Lane | Feb. 17, 1959 |
| 2,930,234 | Harada | Mar. 29, 1960 |
| 2,933,601 | Friedman | Apr. 19, 1960 |

OTHER REFERENCES

Radioactive Snow Gage With Telemetering System, by G. A. Doremus, from Proceedings of the National Electronics Conference, vol. 6, 1950, pp. 518 to 526.